US009560289B2

(12) United States Patent
Aoyama

(10) Patent No.: US 9,560,289 B2
(45) Date of Patent: Jan. 31, 2017

(54) IMAGING APPARATUS AND CONTROL METHOD FOR RECORDING DEVICE

(71) Applicant: CANON KABUSHIKI KAISHA, Tokyo (JP)

(72) Inventor: Satoshi Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/972,924

(22) Filed: Dec. 17, 2015

(65) Prior Publication Data
US 2016/0191817 A1 Jun. 30, 2016

(30) Foreign Application Priority Data

Dec. 25, 2014 (JP) ................................ 2014-263039

(51) Int. Cl.
H04N 5/262 (2006.01)
G11B 27/00 (2006.01)
H04N 5/77 (2006.01)
H04N 5/783 (2006.01)
H04N 5/907 (2006.01)
H04N 9/804 (2006.01)

(52) U.S. Cl.
CPC ........... *H04N 5/2621* (2013.01); *G11B 27/005* (2013.01); *H04N 5/772* (2013.01); *H04N 5/783* (2013.01); *H04N 5/907* (2013.01); *H04N 9/8042* (2013.01)

(58) Field of Classification Search
CPC ...... H04N 5/772; H04N 5/2621; H04N 5/232; G11B 27/005
See application file for complete search history.

(56) References Cited

U.S. PATENT DOCUMENTS

2011/0025865 A1* 2/2011 Kunishige .............. H04N 5/232
348/220.1

FOREIGN PATENT DOCUMENTS

JP 2013-123210 A 6/2013

* cited by examiner

*Primary Examiner* — Huy T Nguyen
(74) *Attorney, Agent, or Firm* — Canon U.S.A., Inc. IP Division

(57) ABSTRACT

A control method for a recording device includes image processing of applying an effect to a moving image, and controlling to record the moving image into a recording medium, when recording a moving image obtained by image capturing. In the image processing, an effect is applied to a moving image corresponding to a partial period of a normal moving image to be recorded into the recording medium with no effect being applied. In the controlling, control is performed to connect the normal moving image to which no effect is applied and a moving image created by applying the effect to the moving image corresponding to the partial period of the normal moving image, to record the normal moving image and the created moving image into the recording medium as a continuous moving image.

15 Claims, 8 Drawing Sheets

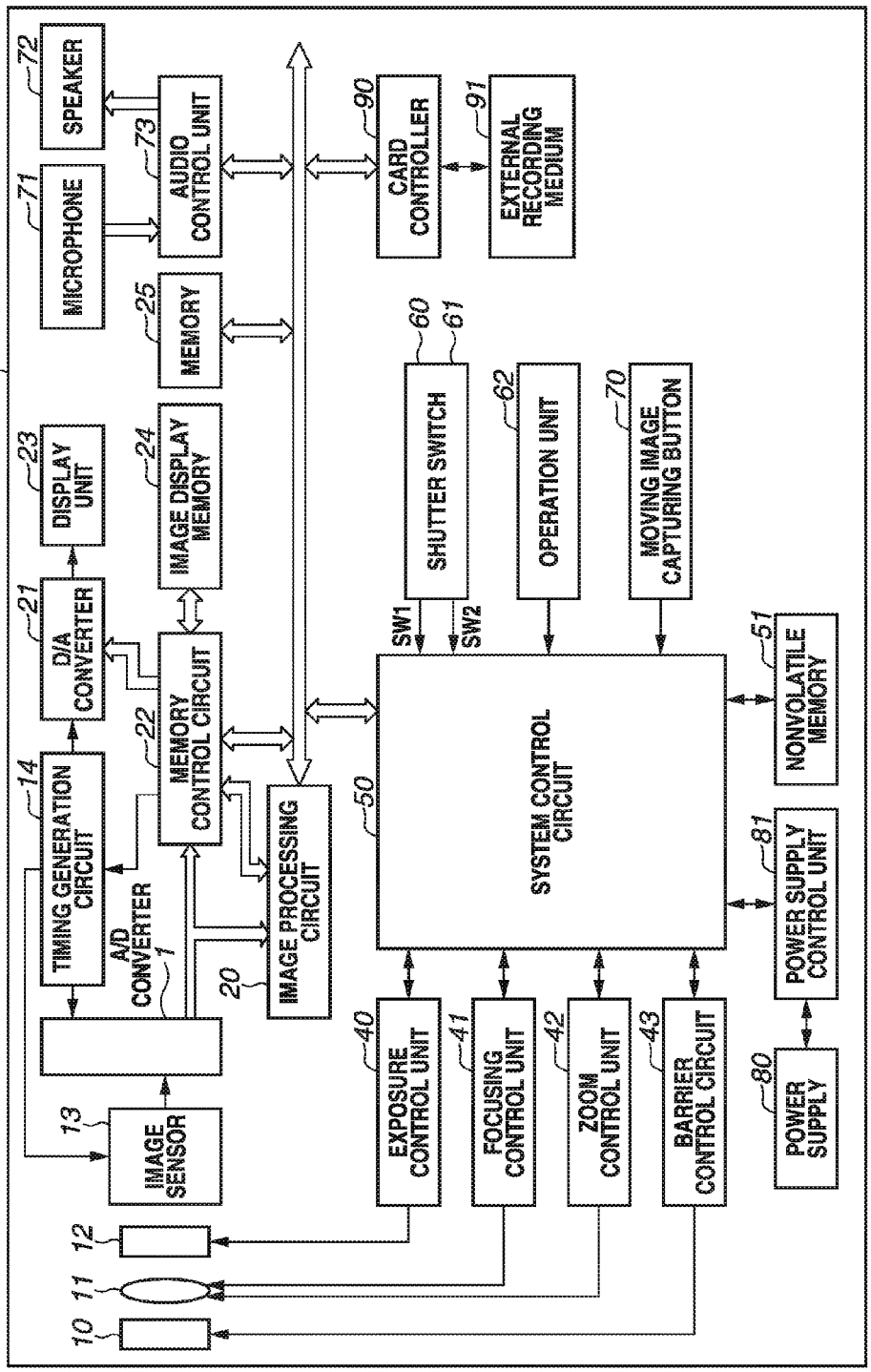

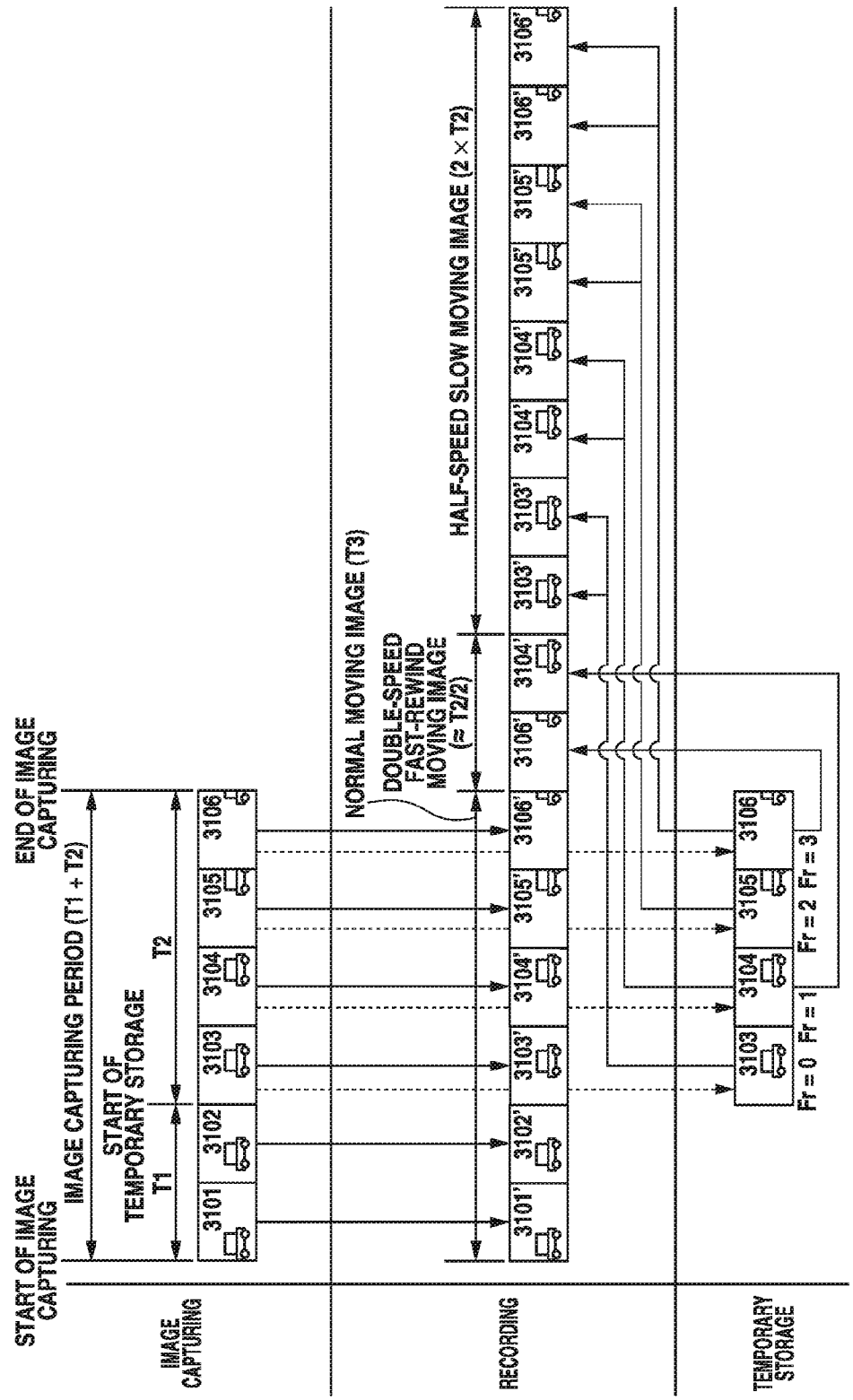

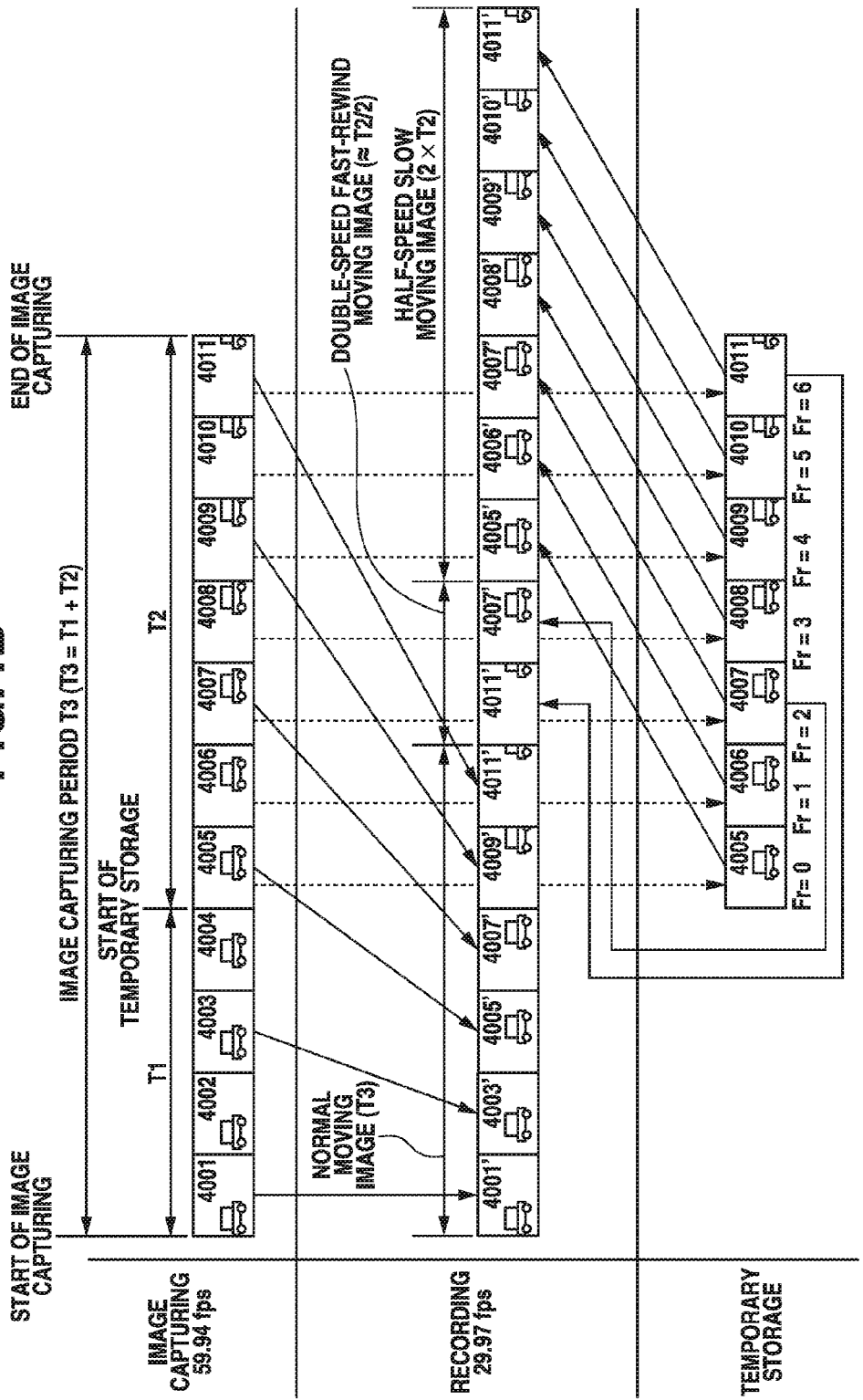

IMAGING APPARATUS AND CONTROL METHOD FOR RECORDING DEVICE

BACKGROUND OF THE INVENTION

Field of the Invention

The present invention relates to moving image capturing in an imaging apparatus and to a method for recording a moving image.

Description of the Related Art

In recent years, there have been increasing opportunities for many users to perform moving image capturing using imaging apparatuses such as digital cameras and smartphones.

Some of the users create works by applying special effects to the captured moving images by using editing software, or by processing the captured moving images, e.g., by combining the moving images.

However, there is such a problem that editing a moving image involves a long time and a heavy load for reasons such as a large file size of moving image data and recompression accompanying the editing.

In this connection, Japanese Patent Application Laid-Open No. 2013-123210 discusses capturing and recording a slow-motion moving image together with a still image when capturing an image, thereby automatically obtaining a time-series image having an impressive video effect.

However, the technique discussed in Japanese Patent Application Laid-Open No. 2013-123210 records only a moving image to which a reproduction effect is added, and does not record a moving image to which no reproduction effect is added.

SUMMARY OF THE INVENTION

The present invention is directed to an imaging apparatus and an image recording method for recording a normal moving image to which no reproduction effect is applied, as well as recording a moving image to which an impressive reproduction effect is applied, in moving image capturing.

In order to solve the aforementioned problems, the present invention provides an imaging apparatus including an image capturing unit configured to capture a moving image, an image processing unit configured to apply an effect to the moving image captured by the image capturing unit, and a control unit configured to perform control to record the moving image captured by the image capturing unit into a recording medium, wherein the image processing unit applies an effect to a moving image corresponding to a partial period of a normal moving image to be recorded into the recording medium with no effect being applied, and wherein the control unit connects the normal moving image and an effect moving image created by applying the effect to the moving image corresponding to the partial period of the normal moving image, to record the normal moving image and the effect moving image into the recording medium as a continuous moving image.

In order to solve the aforementioned problems, the present invention provides a control method for a recording device configured to record a moving image obtained by image capturing, and the control method includes image processing of applying an effect to a moving image, and controlling to record the moving image into a recording medium, wherein, in the image processing, an effect is applied to a moving image corresponding to a partial period of a normal moving image to be recorded into the recording medium with no effect being applied, and wherein, in the controlling, control is performed to connect the normal moving image to which no effect is applied and a moving image created by applying the effect to the moving image corresponding to the partial period of the normal moving image, to record the normal moving image and the created moving image into the recording medium as a continuous moving image.

Further features of the present invention will become apparent from the following description of exemplary embodiments with reference to the attached drawings.

BRIEF DESCRIPTION OF THE DRAWINGS

FIG. 1 is a diagram illustrating a configuration of a digital camera according to an embodiment of the present invention.

FIG. 3C is a diagram illustrating data of a moving image captured and recorded according to a modification of the second exemplary embodiment.

FIG. 4B is a diagram illustrating data of a moving image captured and recorded according to the third exemplary embodiment.

DESCRIPTION OF THE EMBODIMENTS

Figure 2A:
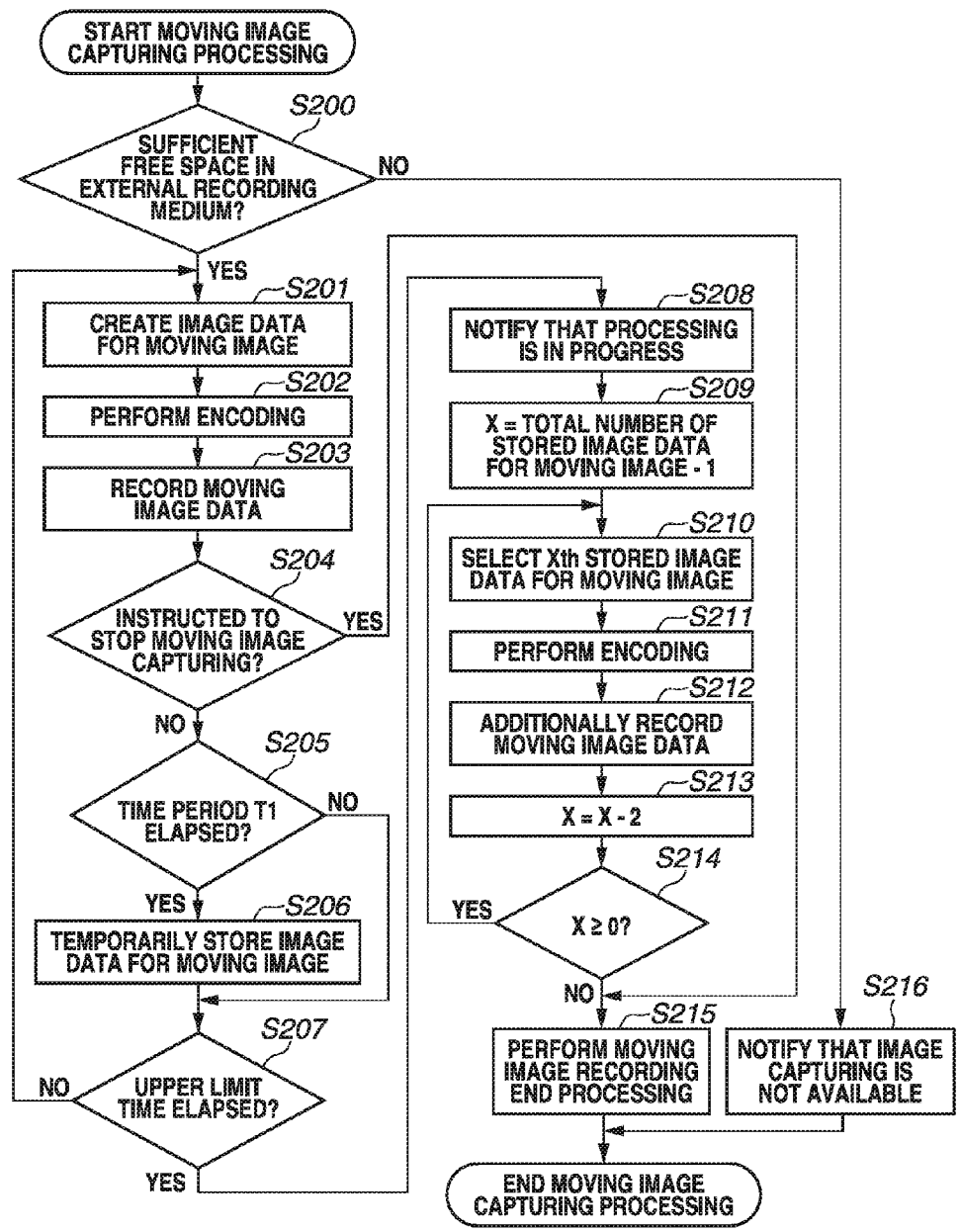
FIG. 2A is a flowchart illustrating moving image capturing according to a first exemplary embodiment.

FIG. 1 is a diagram illustrating a configuration of a digital camera 100 according to an embodiment of the present invention.

A barrier 10 is provided for covering an imaging unit including components such as an imaging lens 11 of the digital camera 100, thereby preventing dirt on and damage to the imaging unit.

In addition to the imaging lens 11, a shutter 12 having an aperture function is provided. Further, an image sensor 13 is provided for converting an optical image obtained via the imaging lens 11 into an electrical signal. The image sensor 13 includes a charge coupled device (CCD) sensor, a complementary metal oxide semiconductor (CMOS) sensor, and the like. An analog-to-digital (A/D) converter 15 is provided for converting an electrical signal obtained by the image sensor 13, from an analog signal output into a digital signal. In other words, the A/D converter 15 converts the electrical signal obtained by the image sensor 13 into the digital signal, so that captured image data can be acquired.

A timing generation circuit 14 is provided for supplying a clock signal and a control signal to the image sensor 13, the A/D converter 15, and a digital-to-analog (D/A) converter 21. The timing generation circuit 14 is controlled by a memory control circuit 22 and a system control circuit 50.

An image processing circuit 20 is provided for performing predetermined pixel interpolation processing and color conversion processing on data from the A/D converter 15 or data from the memory control circuit 22.

In addition, the image processing circuit 20 performs predetermined calculation processing using the captured image data. Based on the calculation result thereby obtained, the system control circuit 50 controls an exposure control unit 40 and a focusing control unit 41, so that automatic focus (AF) processing, automatic exposure (AE) processing, and flash preliminary emission (EF) processing are performed.

Based on the calculation result obtained by performing the predetermined calculation processing using the captured image data, the image processing circuit 20 also performs automatic white balance (AWB) processing.

Further, the image processing circuit 20 reads image data stored in a memory 25, and then performs compression processing or decompression processing in a Joint Photographic Experts Group (JPEG) format or a Moving Picture Experts Group (MPEG)-4 AVC/H.264 format, on the read image data. The image processing circuit 20 then writes the processed data into the memory 25.

The image data digitalized by the A/D converter 15 is written into an image display memory 24 or the memory 25 via the memory control circuit 22 after being processed by the image processing circuit 20, or via the memory control circuit 22 directly from the A/D converter 15.

The memory control circuit 22 controls the A/D converter 15, the timing generation circuit 14, the image processing circuit 20, the image display memory 24, the D/A converter 21, and the memory 25.

As mentioned above, the image display memory 24 and the D/A converter 21 are provided. A display unit 23 is a thin film transistor liquid crystal display (TFT-LCD) or the like. Image data for display that is written in the image display memory 24 is transmitted via the D/A converter 21 to the display unit 23 to be displayed thereon.

If the captured image data are sequentially displayed using the display unit 23, an electronic finder function of displaying a live view image can be realized.

The memory 25 is provided for storing the captured image data (still images and moving images), and has a storage capacity sufficient for storing a predetermined number of still images and moving images having a predetermined length of time. In addition, the memory 25 can also be used as a work area of the system control circuit 50.

The exposure control unit 40 is provided for controlling the shutter 12 having the aperture function.

The focusing control unit 41 is provided for controlling focusing of the imaging lens 11. A zoom control unit 42 is provided for controlling the zooming of the imaging lens 11. A barrier control unit 43 is provided for controlling an operation of the barrier 10.

A microphone 71 is provided for taking in external sounds of a subject and the like. A loudspeaker 72 is provided for outputting an operation sound and a shutter sound of the digital camera 100, and sounds in reproduction of a moving image. An audio control unit 73 is provided for controlling the microphone 71 and the loudspeaker 72, and for controlling the recording level and the volume of input/output audio data. The audio control unit 73 also performs noise cancel processing and the like.

The system control circuit 50 is provided for controlling each component in FIG. 1 and the entire digital camera 100. The system control circuit 50 performs control and calculation processing based on a program stored in a nonvolatile memory 51.

The nonvolatile memory 51 is an electrically erasable and recordable memory. For example, an electrically erasable programmable read only memory (EEPROM) is used for the nonvolatile memory 51. The nonvolatile memory 51 records not only a program but also map information and the like.

A shutter switch SW1 60, a shutter switch SW2 61, and an operation unit 62 are provided for allowing input of various operation instructions to the system control circuit 50. The shutter switch SW1 60, the shutter switch SW2 61, and the operation unit 62 include one or more combinations of a power switch, a mode selection switch, a menu button, cross keys, a touch panel, a pointing device using viewpoint detection, a voice recognition device, and the like.

The shutter switch SW1 60 is turned on during an operation of a shutter button (not illustrated) to provide an instruction for starting an operation of the AF processing, the AE processing, the AWB processing, the EF processing, or the like.

The shutter switch SW2 61 is turned on by completion of the operation of the shutter button (not illustrated) to start image capturing processing.

The operation unit 62 includes components such as various buttons and a touch panel. The operation unit 62 includes a power button, a menu button, a mode selection switch, cross keys, a set button, and the like. The mode selection switch is provided for selecting an image capturing mode, a reproduction mode, and other modes such as a special image capturing mode.

A moving image capturing button 70 is an operation member for providing an instruction for starting or ending moving image capturing.

Further, a power supply control unit 81 is provided.

A power supply 80 includes a primary battery such as an alkaline battery and a lithium battery, or includes a secondary battery such as a nickel-cadmium (NiCd) battery, a nickel-metal hydride (NIMH) battery, and a lithium-ion (Li) battery. The power supply 80 may include an AC adapter.

A card controller 90 is provided for transmitting and receiving data to and from an external recording medium such as a memory card.

An external recording medium 91 is a memory card or the like.

Each component such as the image processing circuit 20, the memory control circuit 22, the exposure control unit 40, the focusing control unit 41, the zoom control unit 42, the barrier control unit 43, the power supply control unit 81, and the card controller 90 is a circuit or a programmed processor dedicated for performing corresponding processing. Each component may have a dedicated circuit or processor, or processing in one or more components may be implemented by one dedicated circuit or processor.

<Image Capturing Processing in Digital Camera 100>

In the digital camera 100, when a switch signal SW2 from the shutter switch 61 is input to the system control circuit 50, an instruction for starting the image capturing processing is provided, so that the image capturing processing is executed.

In the image capturing processing, at first, exposure processing is performed. In the exposure processing, first, an electrical signal is read from the image sensor 13, and then the A/D converter 15 performs analog-to-digital conversion. Then, the converted image data is written into the memory 25 via the memory control circuit 22. Next, development processing is performed. In the development processing, the image processing circuit 20 and the memory control circuit 22 perform calculation for the image data in the memory 25, and then the image data is written into the memory 25 again. Next, recording processing is performed. In the recording processing, first, the image data is read from the memory 25, and then the image processing circuit 20 performs the compression processing on the image data. The image data is then stored back into the memory 25. Then, the card controller 90 performs control for writing the compressed image data into the external recording medium 91. The system control circuit 50 controls the image processing circuit 20 as follows. In still image capturing, the image processing circuit 20 performs the development processing, the compression processing, and the like corresponding to a still image. On the other hand, in moving image capturing, the image processing circuit 20 performs the development processing, the compression processing, and the like corresponding to a moving image.

In the digital camera 100, a user can provide an instruction for starting the moving image capturing by pressing the shutter button (the shutter switch SW2) after switching the mode selection switch included in the operation unit 62 to a mode for the moving image capturing, or by pressing the moving image capturing button 70.

In capturing a moving image, an image captured from the start to the end of the moving image capturing is recorded into an external recording medium. In the digital camera 100 of the first exemplary embodiment, together with a normal moving image captured from the start to the end of the moving image capturing, a moving image to which a reproduction effect is applied can be recorded during the moving image capturing.

<Moving Image Capturing Processing>

Processing in the moving image capturing in the digital camera 100 will be described with reference to FIGS. 2A and 2B. FIG. 2A is a flowchart illustrating moving image capturing processing. The system control circuit 50 performs the control and the calculation processing based on the program read from the nonvolatile memory 51, thereby executing the moving image capturing processing.

The moving image capturing processing of FIG. 2A is executed upon an instruction for starting moving image capturing being input by the press of the shutter button or the moving image capturing button 70.

When an instruction for starting the moving image capturing is provided, first, in step S200, the remaining capacity of the external recording medium 91 is checked. In the digital camera 100 of the present exemplary embodiment, not only a normal moving image but also a moving image to which a reproduction effect is applied is recorded to be connected to the end of the normal moving image. Therefore, the remaining capacity of the external recording medium 91 is checked so that the moving image to which the reproduction effect is applied can be recorded without fail. Specifically, a recording size of moving image data is estimated, and the estimated recording size is compared with free space of the external recording medium 91. If there is no sufficient free space (NO in step S200), the processing proceeds to step S216. In step S216, the user is notified that image capturing cannot be performed due to insufficient recording capacity of the external recording medium 91, and then the moving image capturing processing ends.

Here, in the present moving image capturing processing, an upper limit time for moving image capturing is preset. Exceeding the upper limit time automatically ends the moving image capturing. This upper limit time may be changeable in a settable range, by the user operating the operation unit 62. Whether there is free space is determined by estimating the maximum value of a recording size of moving image data to be recorded into the external recording medium 91. This estimation is performed based on the size of a normal moving image captured within the upper limit time, and the size of moving image data to be obtained by applying a reproduction effect. This estimation of the recording size may be performed by calculation according to the setting of an upper limit time of moving image capturing, the type of a reproduction effect, the time of a moving image to which the reproduction effect is to be applied, and the like. Alternatively, a table may be prepared beforehand, and the recording size may be determined with reference to the table. The table lists an estimated recording size associated with the setting of an upper limit time of moving image capturing, and with the type and the time of a reproduction effect. If it is determined that there is free space (YES in step S200), the processing proceeds to step S201, in which the moving image capturing is started.

In step S201, image data for moving image is created by performing predetermined processing in the A/D converter 15, the image processing circuit 20, and the like, on an output from the image sensor 13 having appropriate exposure as a result of control by the exposure control unit 40. The created image data for moving image is then stored into the memory 25. This image data for moving image is image data not compressed (uncompressed moving image data), which has been resized to an image size (e.g., 1920×1080 (full high definition (FULLHD)), 1280×720 (HD), or the like) preset by the operation unit 62, for example. In addition, in step S201, the output from the image sensor 13 is acquired by controlling the timing generation circuit 14 to achieve a preset frame rate, so that the image data for moving image is created.

In step S202, the image processing circuit 20 performs moving image compression processing (encoding) on the image data for moving image stored in the memory 25. The compressed moving image data is stored into the memory 25.

In step S203, the moving image data created in step S202 is recorded into the external recording medium 91. This recording may be performed frame by frame, or may be performed after two or more frames are stored into the memory 25.

In step S204, it is checked whether an instruction for stopping the moving image capturing is provided by the press of the shutter button or the moving image capturing button 70. If an instruction for stopping the moving image capturing is provided (YES in step S204), the processing proceeds to step S215, in which moving image recording end processing is performed. In the moving image recording end processing, management data for managing moving image data is recorded so that the moving image data recorded in the external recording medium 91 from the start of the moving image capturing processing is recorded as a moving image file. If an instruction for stopping the moving image capturing is not provided (NO in step S204), the processing proceeds to step S205.

In step S205, it is determined whether a time period T1 has elapsed since the start of the moving image capturing. Here, in step S205, the determination may be performed by any method as long as it can be determined whether the moving image capturing corresponding to the time period T1 is completed. Therefore, the determination may be performed by measuring a time from the start of the moving image capturing. Alternatively, the determination may be performed based on the counted number of the image data for moving image or the moving image data that are created since the start of the moving image capturing, i.e., based on the determination of whether the counted number has reached a number corresponding to the time period T1. If the time period T1 has not elapsed since the start of the moving image capturing (NO in step S205), the processing proceeds to step S207, in which it is checked whether the upper limit time for the moving image capturing has elapsed. If the upper limit time has not elapsed (NO in step S207), the processing returns to step S201, to continue the moving image capturing. In step S207 as well, the determination may be performed by any method as long as it can be determined whether capturing of the moving image corresponding to the upper limit time is completed. Therefore, the determination may be performed by measuring a time in a manner similar to that in step S205, or may be performed by counting the number of the image data for moving image or the moving image data that are created since the start of the moving image capturing.

If it is determined in step S205 that the time period T1 has elapsed since the start of the moving image capturing (YES in step S205), the processing proceeds to step S206, in which the image data for moving image created last in step S201 is temporarily stored into the memory 25. If the memory 25 is large enough, a copy of the image data for moving image created in step S201 may be created and then stored into the memory 25. If the memory 25 is not large enough, a storage location of the image data for moving image may be dynamically allocated to prevent overwriting in subsequent moving image capturing. Further, when the image data for moving image is temporarily stored, a number is applied to each of the image data for moving image so that the storage order is clear. In the present exemplary embodiment, a frame number (Fr) is applied by counting such that Fr=0, Fr=1, Fr=2, and so on are applied, in the order in which the temporary storage is performed.

If the upper limit time has elapsed (YES in step S207), the processing proceeds to step S208.

In step S208, the user is notified, by the display provided on the display unit 23, that the moving image capturing ends and processing for a reproduction effect and recording is in progress.

In step S209, the number obtained by subtracting 1 from the total number of the image data for moving image temporarily stored in the memory 25 in step S206 is substituted into a variable X. Here, the frame numbers starting from 0 are applied in step S206, and therefore, the number substituted into the variable X is the frame number of the image data for moving image temporarily stored last into the memory 25.

Next, in step S210, the image data for moving image corresponding to the frame number X, i.e., achieving Fr=X, is selected from among the image data for moving image temporarily stored in the memory 25.

Next, in step S211, the image processing circuit 20 performs the moving image compression processing (encoding) on the selected image data for moving image to create compressed moving image data, and the compressed moving image data is stored into the memory 25.

In step S212, the moving image data created in step S211 is added to the moving image data recorded in the external recording medium 91 in step S203.

In step S213, the value X−2 is substituted into the variable X. In step S214, whether X is 0 or greater is determined. As long as X is 0 or greater (YES in step S214), steps S210 to S214 are repeated.

When X is not 0 or greater (NO in step S214), the processing proceeds to step S215, in which the moving image recording end processing is performed, and management data is recorded so that the moving image data recorded into the external recording medium 91 in steps S203 and S212 are recorded as one moving image file.

Image data for moving image to be captured and moving image data to be recorded by the moving image capturing processing will be described with reference to FIG. 2B.

Figure 2B:
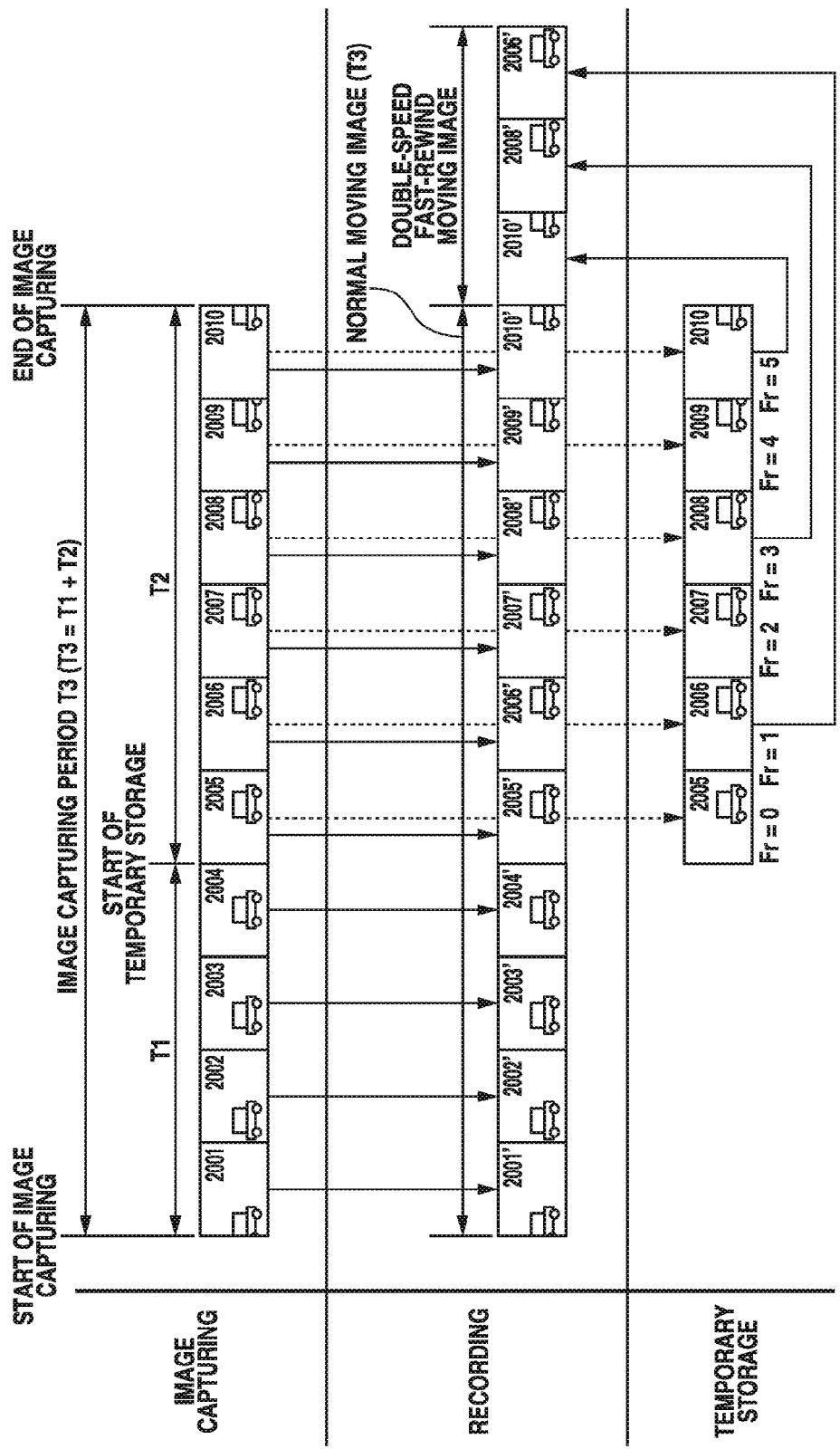
FIG. 2B is a diagram illustrating data of a moving image captured and recorded according to the first exemplary embodiment.

FIG. 2B illustrates image data 2001 to 2010 for moving image, and moving image data 2001' to 2010' obtained by performing the moving image compression processing on the image data 2001 to 2010 for moving image. In other words, among arrow lines in FIG. 2B, broken lines each indicate a case of storing data without performing the moving image compression processing, and solid lines each indicate a case of recording data obtained by performing the moving image compression processing.

First, in the moving image capturing in step S201, image capturing is performed at a predetermined frame rate, so that the image data 2001 to 2010 for moving image are created. Next, in step S202, the moving image compression processing is performed on the image data 2001 to 2010 for moving image captured in a period from the start of image capturing to the end of the image capturing. In step S203, the moving image data 2001' to 2010' are then recorded into the external recording medium 91. The moving image data 2001' to 2010' are recorded as a normal moving image at the same frame rate as the frame rate of the image capturing.

The image data 2001 to 2004 for moving image, which are captured by the lapse of the time period T1 since the start of the image capturing, in the period from the start of the image capturing to the end of the image capturing, are discarded without being temporarily stored into the memory 25. In contrast, the image data 2005 to 2010 for moving image, which are captured in a time period T2 after the lapse of the time period T1 to the end of the image capturing, are temporarily stored into the memory 25. In other words, after the lapse of the time period T1, temporary storage processing also begins. In the time period T2, the moving image data subjected to the moving image compression processing are recorded into the external recording medium 91, and the processing for temporarily storing the uncompressed image data for moving image into the memory 25 is also performed.

After the end of the image capturing, the image data for moving image, which are temporarily stored in the memory 25, are subjected to the moving image compression processing in reverse order of the storage order by skipping every second one, and then recorded to be connected to the normal moving image (steps S209 to S214). Here, the moving image recorded to be connected to the normal moving image is recorded such that every second one of the captured image data for moving image is skipped and a time axis is reversed. Therefore, a double-speed fast-rewind moving image is recorded. This is an image obtained by applying a double-speed fast-rewind reproduction effect to the normal moving image.

In this way, the moving image recorded in the above-described moving image capturing processing is recorded as a continuous moving image in one moving image file including a series of moving images by connecting, to the end of the normal moving image, the double-speed fast-rewind moving image corresponding to a partial period (T2) of the normal moving image.

The moving image obtained by applying the reproduction effect to the normal moving image is recorded to be connected to the normal moving image, which is obtained from the start to the end of moving image recording and to which no reproduction effect is applied. Therefore, the user can automatically acquire a moving image to which an impressive reproduction effect is applied, only by performing an operation for the moving image capturing, without performing a special editing operation, while keeping the normal moving image. In addition, since a normal moving image and a reproduction-effect moving image are connected and recorded as one moving image file, a moving image with a reproduction effect can be readily reproduced only by reproducing the one moving image file obtained by image capturing, in reproduction of the moving image.

In the present exemplary embodiment, the reproduction effect is applied to the moving image captured after the lapse of the time period T1, and then the obtained moving image is recorded to be connected to the normal moving image. However, a double-speed reverse-reproduction moving image, which is obtained by applying a reproduction effect (a double-speed reverse-reproduction effect) to the entire normal moving image, may be recorded to be connected to the normal moving image. In addition, the time period T1 may be settable by the user. Alternatively, the time period T2 for which a reproduction effect is applied may be settable by the user. In this case, image data for moving image corresponding to the time period T2 may be temporarily stored into the memory 25 in step S206, and past image data for moving image may be discarded, when the temporarily stored image data exceeds the time period T2.

In addition, in the above-described moving image capturing processing, it is necessary to temporarily store the image data for moving image corresponding to the time period T2 into the memory 25 for the following reason. Since the compressed moving image data is recorded with a reverse reproduction effect for reversing a time axis, as a reproduction effect, the moving image data cannot be created until the end of the image capturing. In particular, in the moving image compression processing, in a case where interframe compression is performed, the moving image compression processing requires image data for moving image of previous and subsequent frames or a previous frame. Therefore, the compressed moving image data cannot be created and recorded into an external recording medium beforehand. For this reason, it is necessary to temporarily store the image data for moving image to which the double-speed reverse-reproduction effect is to be applied.

The time periods T1 and T2, the upper limit time for the moving image capturing, and the like, which are associated with the capacity for the temporary storage of data, may be restricted to a settable range considering the amount of image data for moving image temporarily storable into the memory 25.

In the above-described moving image capturing processing, the upper limit time for the moving image capturing is limited according to the capacity of the memory 25. Therefore, two modes may be prepared. One is a mode of recording a normal moving image and a reproduction-effect moving image of the above-described moving image capturing processing, and the other is a normal moving image capturing mode of recording only a normal moving image. In the normal moving image capturing mode, processes in steps S201 to S204 and S215 are performed, and if an instruction for stopping the moving image capturing is not provided in step S204, the processing returns to step S201. In other words, the following is performed. Image data for moving image is created based on image capturing at a predetermined frame rate in a period from a moving image capturing start instruction to a moving image capturing end instruction (step S201). Next, moving image data is obtained by encoding the captured image data for moving image (step S202). The obtained moving image data is recorded as one moving image file into the external recording medium 91 (steps S203 and S215).

Further, in the above-described moving image capturing processing, the double-speed reverse-reproduction effect is applied as a reproduction effect in the creation of the reproduction-effect moving image by the system control circuit 50 and the image processing circuit 20. However, the reproduction effect is not limited to this example. A normal-speed reproduction effect (not skipping every second one in step S213) or a triple-speed reproduction effect (skipping every second and third one, i.e., X=X−3, in step S213) may be performed. Further, not only the fast-rewind reproduction effect but also other reproduction effects may be provided. The other reproduction effects include a fast-forward reproduction effect, a slow reproduction effect, a slow-rewind reproduction effect, and the like.

Moreover, in the present exemplary embodiment, the moving image with the reproduction effect is recorded to be connected to the end of the normal moving image. In reproduction, the normal moving image is reproduced first. Therefore, the normal moving image can be readily checked, and besides, it is possible to provide not only the normal moving image but also the moving image with the reproduction effect.

In the first exemplary embodiment, the description has been given of the moving image capturing processing of recording the reproduction-effect moving image, which is obtained by applying the double-speed reverse-reproduction effect to the moving image corresponding to a predetermined period of the normal moving image such that the reproduction-effect moving image is connected to the normal moving image. In a second exemplary embodiment, moving image capturing processing is performed as follows. First, a fast-rewind moving image and a slow moving image are created by applying a reverse reproduction effect and a slow reproduction effect, respectively, to a moving image corresponding to a predetermined period of a normal moving image. Next, a moving image obtained by connecting the fast-rewind moving image and the slow moving image to the normal moving image is recorded. This moving image capturing processing will be described below.

The basic processing is similar to the basic processing in the first exemplary embodiment, and therefore, only a different part will be described. The processing similar to the processing in the first exemplary embodiment is assigned the same number as the number in the first exemplary embodiment, and description of such processing will be omitted.

The moving image capturing processing of the second exemplary embodiment will be described using FIGS. 3A and 3B.

Figure 3A:
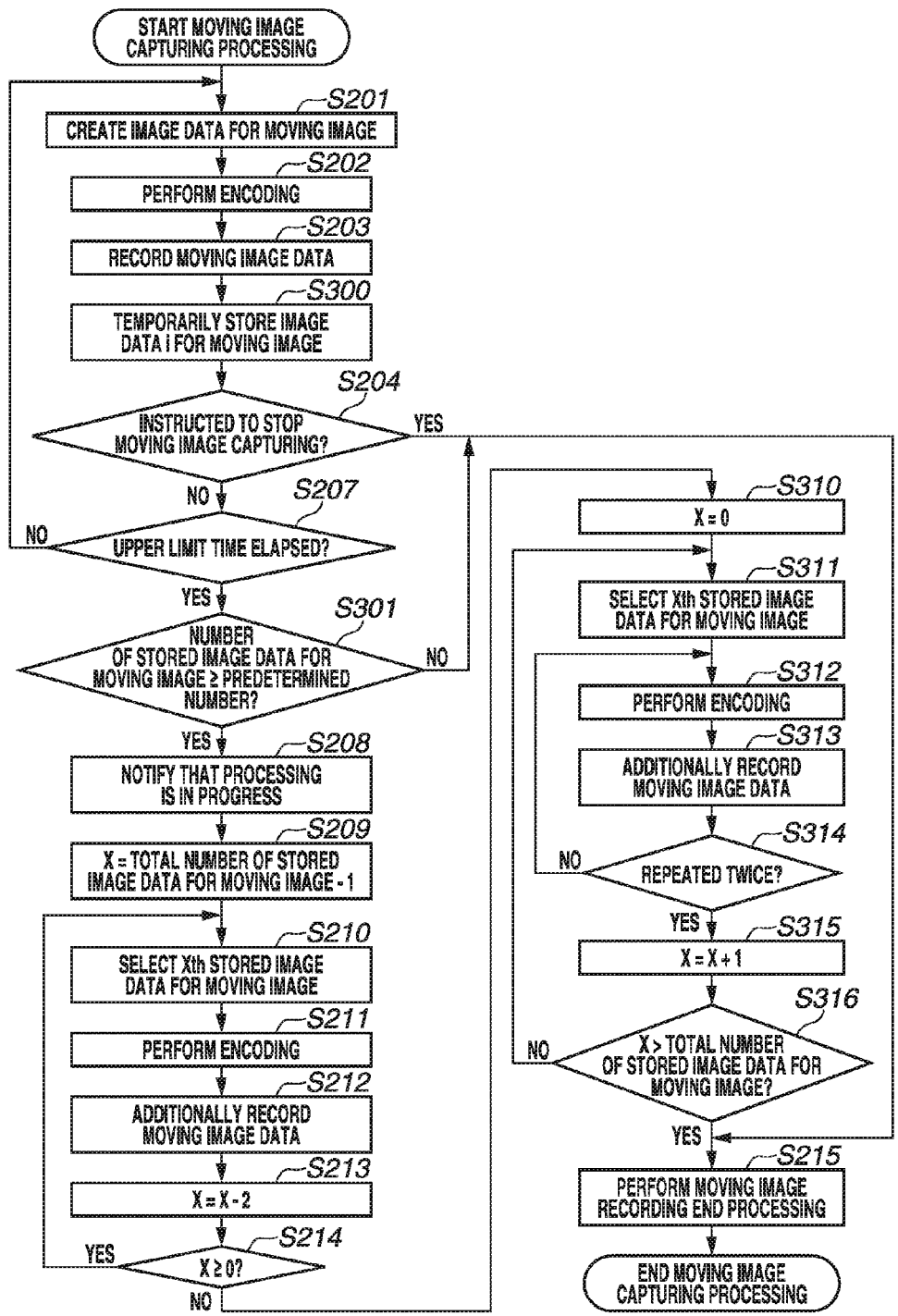
FIG. 3A is a flowchart illustrating moving image capturing according to a second exemplary embodiment.

FIG. 3A is a flowchart of the moving image capturing processing of the second exemplary embodiment. As with the first exemplary embodiment, this moving image capturing processing is executed upon an instruction for starting moving image capturing being input by the press of the shutter button or the moving image capturing button 70. The system control circuit 50 performs control and calculation processing based on a program read from the nonvolatile memory 51, thereby executing this moving image capturing processing.

In the moving image capturing processing of the present exemplary embodiment, the remaining recording capacity of the external recording medium 91 is not checked although it is checked in step S200 of the first exemplary embodiment. This is because, in the moving image capturing processing of the present exemplary embodiment, as soon as the external recording medium 91 is fully occupied during moving image capturing, the moving image capturing ends so as not to record a reproduction-effect moving image, although this is not illustrated in the flowchart of FIG. 3A.

In the moving image capturing processing of the present exemplary embodiment, as with the first exemplary embodiment, at first, in step S201, image data for moving image is created by capturing a moving image. Next, in step S202, moving image data is created by performing moving image compression processing on the image data for moving image. In step S203, the created moving image data is then recorded into the external recording medium 91.

Next, in step S300, the image data for moving image created in step S201 is temporarily stored into the memory 25. In the first exemplary embodiment, this temporary storage is performed after the lapse of the time period T1. In contrast, in the present exemplary embodiment, execution of the temporary storage begins at the start of the moving image capturing. If the memory 25 is large enough, a copy of the image data for moving image created in step S201 may be created and then separately stored into the memory 25. Alternatively, instead of copying the image data, a storage location of subsequent image data for moving image may be dynamically allocated to prevent the image data for moving image to be temporarily stored from being overwritten. Further, an upper limit on the number of image data for moving image to be temporarily stored may be determined beforehand. When storage beyond the upper limit is to be performed, image data for moving image may be deleted in chronological order. In this case, the upper limit is set on the length of a reproduction-effect moving image.

Next, in step S204, it is checked whether an instruction for stopping the moving image capturing is provided. If an instruction for stopping the moving image capturing is provided (YES in step S204), the processing proceeds to step S301. If an instruction for stopping the moving image capturing is not provided (NO in step S204), the processing proceeds to step S207. In step S207, it is determined whether the upper limit time has elapsed. If the upper limit time has not elapsed (NO in step S207), processes in steps S201 to S203, S300, S204, and S207 are repeated. If it is determined that the upper limit time has elapsed (YES in step S207), the processing proceeds to step S301.

In step S301, it is determined whether the number of the image data for moving image temporarily stored in the memory 25 is equal to or greater than a predetermined number. Specifically, it is determined whether the frame number of image data for moving image temporarily-stored last is equal to or greater than the predetermined number. When the number of image data for moving image temporarily stored is less, i.e., when the length of the moving image to which a reproduction effect is applied is short, it is difficult to check the reproduction effect. In addition, in the moving image capturing processing of the present exemplary embodiment, a reproduction-effect moving image, which is obtained by applying a reproduction effect to a normal moving image, is recorded to be connected to the end of the normal moving image. Therefore, it is conceivable that, when the normal moving image is short, a boundary between the normal moving image and the reproduction-effect moving image may become unclear. For this reason, when the number of the temporarily stored image data for moving image is less (NO in step S301), the processing proceeds to step S215, without performing processing for creating a reproduction-effect moving image. In step S215, the moving image recording end processing is performed, so that the moving image data of the normal moving image recorded till then are recorded as one moving image file. When the number of the temporarily stored image data for moving image is equal to or greater than the predetermined number (YES in step S301), the processing proceeds to step S208, in which the user is notified, by the display on the display unit 23, that processing for creating a moving image with the reproduction effect is in progress.

In steps S209 to S214, as with the first exemplary embodiment, based on the image data for moving image temporarily stored in the memory 25, a double-speed fast-rewind moving image is created by applying a double-speed reverse-reproduction effect, and then recorded to be added to the moving image data of the normal moving image recorded in step S203. When the creation and recording of the double-speed fast-rewind moving image are completed, the processing proceeds to step S310.

In step S310, 0 is substituted into a variable X. Next, in step S311, Xth image data for moving image is selected from among the image data for moving image temporarily stored in the memory 25. In other words, at the beginning, the image data for moving image, which is first image data temporarily stored into the memory 25 in step S300 in the current moving image capturing processing, is selected. Next, in step S312, moving image data is created by performing moving image compression processing (encoding) on the image data for moving image selected in step S311. Next, in step S313, the moving image data created in step S312 is added to the moving image data recorded in the external recording medium 91 in step S212. In step S314, it is checked whether the series of processes in steps S312 and S313 is repeated twice for the same image data for moving image. If the repetition is not completed (NO in step S314), the processes in steps S312 and S313 are performed for the same image data for moving image. If the series of processes in steps S312 and S313 is performed twice for the same image data for moving image (YES in step S314), the processing proceeds to step S315. In step S315, X+1 is substituted into X. Next, in step S316, it is determined whether X is equal to or greater than the total number of the image data for moving image temporarily stored in the memory 25 (or, whether X exceeds the frame number of the image data temporarily stored last). If a result of this determination is negative (NO in step S316), the series of processes in steps S311 to S315 is repeated. In other words, for all the image data for moving image recorded in the memory 25, the series of processes in steps S311 to S313 is repeated sequentially from the image data for moving image temporarily stored first into the memory 25. If the result of the determination is positive (YES in step S316), the processing proceeds to step S215. In step S215, the moving image recording end processing is performed for the moving image data recorded in the external recording medium 91 in steps S203, S212, and S313, and management information for recording the moving image data as one moving image file is recorded.

Next, data to be captured and recorded through the moving image capturing processing of the present exemplary embodiment will be described using FIG. 3B.

Figure 3B:
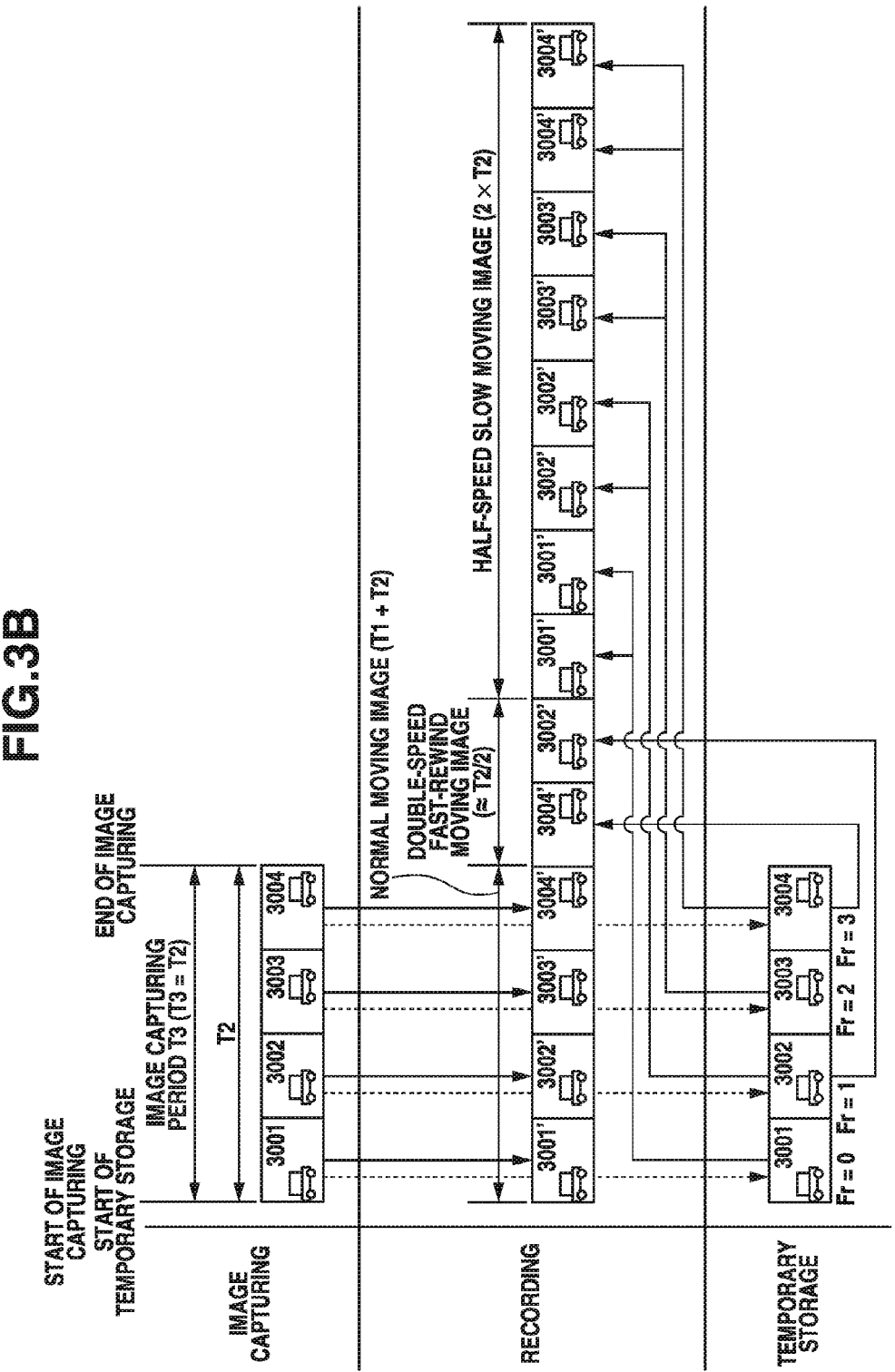
FIG. 3B is a diagram illustrating data of a moving image captured and recorded according to the second exemplary embodiment.

FIG. 3B illustrates image data 3001 to 3004 for moving image captured in a period from the start of moving image capturing to the end of the moving image capturing. FIG. 3B also illustrates moving image data 3001' to 3004' created by applying the moving image compression processing on the image data 3001 to 3004 for moving image, respectively. In other words, among arrow lines in FIG. 3B, as with FIG. 2B, broken lines each indicate a case of recording data without performing the moving image compression processing, and solid lines each indicate a case of recording data obtained by performing the moving image compression processing.

First, in step S201, image capturing is performed at a predetermined frame rate in a time period T3 from the start of the moving image capturing to the end of the moving image capturing, so that the image data 3001 to 3004 for moving image are created.

In step S202, the moving image compression processing is performed on the image data 3001 to 3004 for moving image captured in the period from the start of the image capturing to the end of the image capturing, so that the moving image data 3001' to 3004' are created. In step S203, the moving image data 3001' to 3004' created by the moving image compression processing are then recorded into the external recording medium 91. The moving image data 3001' to 3004' are recorded as a normal moving image at the same frame rate as the frame rate of the image capturing.

In the present exemplary embodiment, temporary storage of the image data for moving image begins immediately after the start of image capturing. Therefore, the time period T2 for the temporary storage is T2=T3, and the image data 3001 to 3004 for moving image captured in the period from the start of the image capturing to the end of the image capturing are temporarily stored into the memory 25.

In other words, in the time period T2 (=T3), there is performed not only recording of moving image data subjected to the moving image compression processing into the external recording medium 91, but also processing for temporarily storing uncompressed image data for moving image into the memory 25.

After the end of the image capturing, the image data for moving image temporarily stored in the memory 25 are subjected to the moving image compression processing in reverse order of the storage order by skipping every second one, and then recorded to be connected to the end of the normal moving image (step S209 to step S214). Here, the moving image recorded to be connected to the normal moving image is recorded such that every second one of the captured image data for moving image is skipped and a time axis is reversed. Therefore, a double-speed fast-rewind moving image (a double-speed reverse reproduction moving image) obtained by applying a double-speed fast-rewind reproduction effect (a double-speed reverse-reproduction effect) to the normal moving image is recorded.

Afterward, the image data for moving image temporarily stored in the memory 25 are read in storage order, and then recorded to follow the double-speed fast-rewind moving image after being subjected to the moving image compression processing (steps S310 to S316). In this process, the recording is performed such that the moving image compression processing is performed twice for the same image data for moving image. As a result, a half-speed slow moving image with a half-speed slow reproduction effect is recorded subsequent to the double-speed fast-rewind moving image.

Therefore, in the moving image capturing processing of the second exemplary embodiment, the double-speed fast-rewind moving image based on the normal moving image and the half-speed slow moving image based on the normal moving image are recorded following the normal moving image captured from the start to the end of the image capturing. The moving image data including these moving images are recorded as one moving image file.

In the second exemplary embodiment, the image data for moving image is temporarily stored immediately after the start of the image capturing. A plurality of reproduction effects is applied to the image data for moving image obtained by the image capturing in the time period T3 from the start of the image capturing to the end of the image capturing. The obtained image is recorded to follow the normal moving image obtained by the image capturing in the time period T3. However, as with the first exemplary embodiment, only recording to the external recording medium 91 may be performed without performing temporary storage until the time period T1 elapses from the start of image capturing. Afterward, in the time period T2 after the lapse of the time period T1 to the end of the image capturing, the recording to the external recording medium 91 and the temporary storage may be performed. In this case, as illustrated in FIG. 3C, in the time period T1, image data 3101 and 3102 for moving image obtained by image capturing are subjected to the moving image compression processing, and then the compressed moving image data 3101' and 3102' are recorded into the external recording medium 91. Next, in the time period T2, image data 3103 to 3106 for moving image obtained by the image capturing are subjected to the moving image compression processing and then the compressed moving image data 3103' to 3106' are recorded into the external recording medium 91, and besides, the image data 3103 to 3106 for moving image are temporarily stored into the memory 25. After the end of the image capturing, using the image data 3103 to 3106 for moving image captured and stored into the memory 25 in the time period T2, a double-speed fast-rewind moving image and a half-speed slow moving image are created, and recorded to follow a normal moving image. As a result, these images are recorded as one moving image file.

In the present exemplary embodiment, a plurality of types of reproduction effects including a double-speed fast-rewind effect and a half-speed slow effect is applied to the same image data for moving image, as a reproduction effect. However, the reproduction effect is not limited to this example, and any of a fast-forward reproduction effect, a fast-rewind reproduction effect, a slow reproduction effect, a slow-rewind reproduction effect, and the like may be selected as appropriate and applied.

Applying the fast-rewind reproduction effect creates a special moving image totally different from a normal moving image, and therefore an interesting moving image can be automatically created. Assume that, as in the present exemplary embodiment, reproduction effects are applied in order of normal→reverse reproduction effect→forward reproduction effect (a slow reproduction effect), to the same moving image. In this case, although the reproduction direction of a moving image changes, there is no occurrence of a large jump between the times of frames of a recorded moving image. Therefore, a consecutive moving image without strangeness can be created even if a reproduction effect is applied.

In the second exemplary embodiment, the description has been given of a case of applying the reverse reproduction effect and furthermore, applying the slow reproduction effect by creating the moving image data using the same image data for moving image a plurality of times. In a third exemplary embodiment, moving image capturing processing in another case will be described. In this case, when a slow reproduction effect is applied, a slow reproduction effect with higher image quality is applied by setting an image capturing frame rate and a recording frame rate to be different from each other, instead of reproducing the same image data for moving image a plurality of times.

The basic processing is similar to the basic processing in the first exemplary embodiment and the second exemplary embodiment, and therefore, only a different part will be described. The processing similar to the processing in the first exemplary embodiment is assigned the same number as the number in the first exemplary embodiment, and description of such processing will be omitted.

Figure 4A:
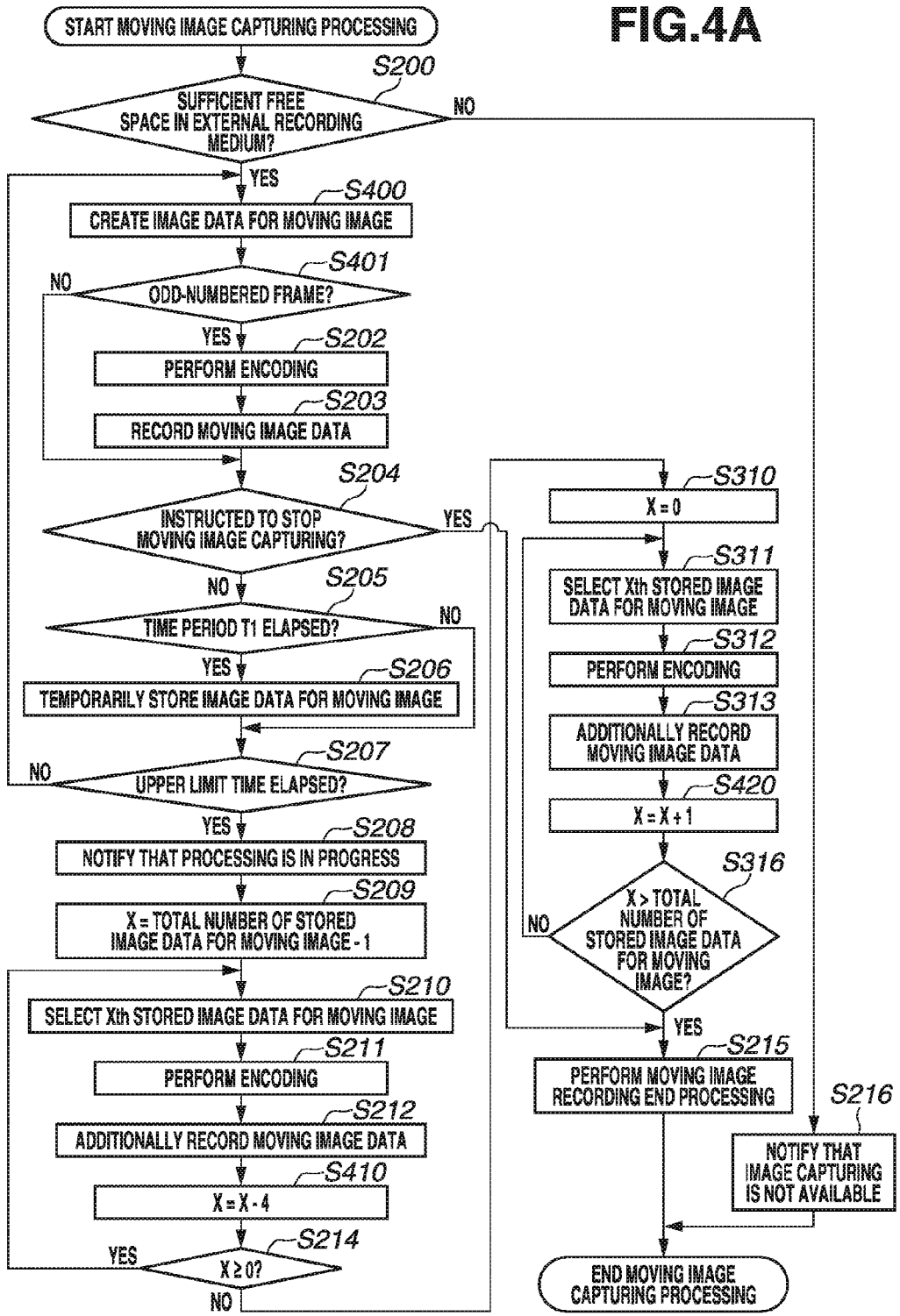
FIG. 4A is a flowchart illustrating moving image capturing according to a third exemplary embodiment.

The moving image capturing processing of the third exemplary embodiment will be described using FIGS. 4A and 4B.

First, in step S200, the remaining capacity of the external recording medium 91 is checked, as with the first exemplary embodiment. If it is determined that there is no sufficient free space (NO in step S200), the processing proceeds to step S216. In step S216, the user is notified that image capturing cannot be performed due to insufficient recording capacity of the external recording medium 91, and then, the moving image capturing processing ends. If it is determined that there is sufficient free space (YES in step S200), the processing proceeds to step S400.

In step S400, as in step S201 of the first exemplary embodiment, image data for moving image is created by performing predetermined processing in the A/D converter 15, the image processing circuit 20, and the like, on an output from the image sensor 13. The created image data for moving image is then stored into the memory 25. However, in step S400, the image data for moving image is created by acquiring an output from the image sensor 13 by controlling the timing generation circuit 14 so as to achieve a frame rate double a preset frame rate for moving image recording. In other words, capturing a moving image is performed at a frame rate double the recording frame rate. In the present exemplary embodiment, the recording frame rate and the image capturing frame rate are assumed to be set at 29.97 fps and 59.94 fps, respectively, but other frame rates (e.g., 30 fps for recording and 60 fps for image capturing) may be used. In step S401, it is determined whether the image data for moving image, which is created in step S400, is an odd-numbered frame or an even-numbered frame counted from start of image capturing. When it is determined that the image data for moving image is an even-numbered frame (NO in step S401), moving image compression processing in step S202 and moving image data recording processing in step S203 are skipped. When it is determined that the image data for moving image is an odd-numbered frame (YES in step S401), the moving image compression processing in step S202 and the moving image data recording processing in step S203 are performed. The image data for moving image (frames) obtained by the image capturing are recorded by skipping every second one. Therefore, the recording frame rate is half the image capturing frame rate.

Processes in and after step S204 are subsequently performed in a manner similar to the second exemplary embodiment. However, in the third exemplary embodiment, the image capturing frame rate is set to be double the recording frame rate. Therefore, a method for determining a frame (image data for moving image) in recording is different from the methods in the first exemplary embodiment and the second exemplary embodiment. In the first and second exemplary embodiments, in steps S209 to S214, when the double-speed reverse-reproduction effect is applied, one frame is skipped by substituting X−2 into X. However, in the present exemplary embodiment, in step S410, three frames are skipped by substituting X−4 into X. Further, in the second exemplary embodiment, when the slow reproduction effect is applied in steps S310 to S316, the next frame is processed after it is determined in step S314 that the same frame is repetitively used. However, in the present exemplary embodiment, in step S420, X+1 is substituted into X without repetitively using the same frame. Therefore, moving image data are created sequentially one by one.

Data to be captured and recorded through such moving image capturing processing will be described with reference to FIG. 4B.

FIG. 4B illustrates image data 4001 to 4011 for moving image captured in a period from the start of moving image capturing to the end of the moving image capturing. FIG. 4B also illustrates moving image data 4001' to 4011' created by applying the moving image compression processing to the image data 4001 to 4011 for moving image, respectively. Among arrow lines in FIG. 4B, as with FIGS. 2B, 3B, and 3C, broken lines each indicate a case of recording data without performing the moving image compression processing, and solid lines each indicate a case of recording data obtained by performing the moving image compression processing.

First, in step S400, in a time period T3 from the start of the moving image capturing to the end of the moving image capturing, image capturing is performed at the image capturing frame rate (59.94 fps), so that the image data 4001 to 4011 for moving image are created. In step S202, among the image data 4001 to 4011 for moving image captured in the period from the start of the moving image capturing to the end of the moving image capturing, only the image data for moving image of the odd-numbered frame, i.e., one in every two is subjected to the moving image compression processing. In step S203, the moving image data created by the moving image compression processing are recorded into the external recording medium 91. The recording frame rate is half the image capturing frame rate. Therefore, a half of the image data for moving image obtained by the image capturing are subjected to the moving image compression processing and then recorded, so that an image capturing time and a reproduction time become equal, although the image capturing frame rate and the recording frame rate are different. In other words, a normal moving image without a reproduction effect is recorded.

After the lapse of the time period T1 from the start of the image capturing, in the time period T2 until the end of the image capturing, there is performed not only recording of this normal moving image but also processing for temporarily storing image data for moving image obtained by the image capturing and not being subjected to the moving image compression processing, into the memory 25.

After the end of the image capturing, the image data for moving image, which are temporarily stored in the memory 25, are subjected to the moving image compression processing in reverse order of the storage order by skipping every second to fourth one, and then recorded to be connected to the normal moving image (steps S209 to S212, S410, and S214). In other words, one in four of the image data for moving image is recorded. While the image capturing frame rate is double the recording frame rate, a quarter of the image capturing frames is recorded. Therefore, the double-speed reproduction effect is applied to the recorded image. In addition, since the recording is performed in the reverse order of the storage order, the moving image with the double-speed reverse-reproduction effect is recorded into the external recording medium 91.

Afterward, the image data for moving image, which are temporarily stored in the memory 25, are read in storage order, and then recorded to follow the double-speed fast-rewind moving image, after being subjected to the moving image compression processing in steps S310 to S313, S420, and S316. The image capturing frame rate is double the recording frame rate, and the image data for moving image obtained by the image capturing are sequentially recorded without skipping. Therefore, the half-speed slow moving image obtained by applying the half-speed slow reproduction effect is recorded to follow the double-speed fast-rewind moving image.

In the second exemplary embodiment, the same image data (frame) for the moving image is used twice to apply the slow reproduction effect. In contrast, in the present exemplary embodiment, the frame to be used for the slow reproduction effect is acquired by the image capturing with the image capturing frame rate set to be double the recording frame rate, instead of using the same frame twice. Therefore, the slow reproduction effect with high image quality can be applied.

In the present exemplary embodiment, the image capturing frame rate is set to be double the recording frame rate so as to apply the half-speed slow reproduction effect. However, the multiple of the image capturing frame rate may be changed according to a slow multiplied speed in applying a slow reproduction effect.

The present invention has been described in detail based on the exemplary embodiments. However, the present invention is not limited to these specific exemplary embodiments, and may include various forms within the scope not departing from the gist of the present invention. The above-described exemplary embodiments may be partially combined as appropriate.

All the types of moving image capturing processing described above in the exemplary embodiments may be implemented in a single digital camera. In this case, which type of moving image capturing processing is to be applied in moving image capturing may be selected according to a selection operation by a user, or randomly selected in the system control circuit 50, or may be selected in the system control circuit 50 by using an image analysis result.

In addition, in the above-described exemplary embodiments, the digital camera implementing the present invention has been described. However, the present invention may be implemented in any other type of apparatus such as a camera-equipped portable telephone, a mobile terminal, and a game console. Further, the present invention may be implemented in a system in which an imaging apparatus including a camera is connected to a recording device for recording an image captured by the imaging apparatus. In this case, only either one of them is required to control each device to implement the above-described flows.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-263039, filed Dec. 25, 2014, which is hereby incorporated by reference herein in its entirety.

What is claimed is:

1. An imaging apparatus comprising:
    an image capturing unit configured to capture a moving image;
    an image processing unit configured to apply an effect to the moving image captured by the image capturing unit; and
    a control unit configured to perform control to record the moving image captured by the image capturing unit into a recording medium,
    wherein the image processing unit applies an effect to a moving image corresponding to a partial period of a normal moving image to be recorded into the recording medium with no effect being applied, and
    wherein the control unit connects the normal moving image and an effect moving image created by applying the effect to the moving image corresponding to the partial period of the normal moving image, to record the normal moving image and the effect moving image into the recording medium as a continuous moving image.

2. The imaging apparatus according to claim 1, wherein an effect applied to a moving image by the image processing unit is a reproduction effect including at least one of a fast-forward reproduction effect, a fast-rewind reproduction effect, a slow reproduction effect, and a slow-rewind reproduction effect, and
    wherein the image processing unit creates a reproduction-effect moving image by applying the reproduction effect.

3. The imaging apparatus according to claim 2, wherein, when recording the moving image captured by the image capturing unit into the recording medium, the control unit performs control to connect the normal moving image and the reproduction-effect moving image created by applying the reproduction effect to the moving image corresponding to the partial period to record the normal moving image and the reproduction-effect moving image into the recording medium as a continuous moving image.

4. The imaging apparatus according to claim 2, wherein the control unit performs control to record the normal moving image and the reproduction-effect moving image to which the reproduction effect is applied by the image processing unit, so that the reproduction-effect moving image is connected to an end of the normal moving image.

5. The imaging apparatus according to claim 2, wherein the image processing unit creates a fast-rewind reproduction moving image by applying a fast-rewind effect to the moving image corresponding to the partial period, and
    wherein the control unit performs control to connect the fast-rewind reproduction moving image to an end of the normal moving image to which no reproduction effect is applied, to record the normal moving image and the fast-rewind reproduction moving image as a continuous moving image.

6. The imaging apparatus according to claim 2, wherein the image processing unit creates a fast-rewind moving image and a slow moving image by applying a fast-rewind effect and a slow reproduction effect, respectively, to the moving image corresponding to the partial period, and wherein the control unit performs control to connect the fast-rewind moving image to an end of the normal moving image to which no reproduction effect is applied, and connect the slow moving image to an end of the fast-rewind moving image, to record the normal moving image, the fast-rewind moving image, and the slow moving image as a continuous moving image.

7. The imaging apparatus according to claim 2, further comprising a temporary storage unit configured to temporarily store uncompressed moving image data not being subjected to compression processing, during image capturing of a moving image by the image capturing unit, wherein the image processing unit creates a reproduction-effect moving image by applying a reproduction effect using the uncompressed moving image data temporarily stored by the temporary storage unit.

8. The imaging apparatus according to claim 7, wherein, in response to an image capturing end of a moving image to be recorded into the recording medium, the image processing unit creates the reproduction-effect moving image by applying the reproduction effect using the uncompressed moving image data temporarily stored by the temporary storage unit.

9. The imaging apparatus according to claim 7, wherein, in response to lapse of a predetermined time from an image capturing start of the moving image to be recorded into the recording medium, the temporary storage unit starts temporarily storing the uncompressed moving image data not being subjected to the compression processing.

10. An imaging apparatus comprising:

an image capturing unit configured to capture a moving image;

an image processing unit configured to apply a reproduction effect to the moving image captured by the image capturing unit; and a control unit configured to perform control to record the moving image captured by the image capturing unit into a recording medium, wherein the image processing unit creates a plurality of effect moving images by applying a plurality of types of reproduction effects to a same moving image captured by the image capturing unit, and wherein the control unit performs control to connect the moving image to which the reproduction effect is not applied and the plurality of effect moving images, to record the moving image to which the reproduction effect is not applied and the plurality of effect moving images as a series of moving images.

11. The imaging apparatus according to claim 10, wherein an effect applied to a moving image by the image processing unit is a reproduction effect including at least one of a fast-forward reproduction effect, a fast-rewind reproduction effect, a slow reproduction effect, and a slow-rewind reproduction effect, and wherein the image processing unit creates a reproduction-effect moving image by applying the reproduction effect.

12. A control method for a recording device configured to record a moving image obtained by image capturing, the control method comprising:

image processing of applying an effect to a moving image; and controlling to record the moving image into a recording medium, wherein, in the image processing, an effect is applied to a moving image corresponding to a partial period of a normal moving image to be recorded into the recording medium with no effect being applied, and wherein, in the controlling, control is performed to connect the normal moving image to which no effect is applied and a moving image created by applying the effect to the moving image corresponding to the partial period of the normal moving image, to record the normal moving image and the created moving image into the recording medium as a continuous moving image.

13. A non-transitory computer-readable storage medium storing a program for executing the control method according to claim 12.

14. A control method for a recording device configured to record a moving image obtained by image capturing, the control method comprising:

image processing of applying a reproduction effect to a moving image; and controlling to record the moving image into a recording medium, wherein, in image processing, a plurality of effect moving images is created by applying a plurality of types of effects to the same moving image obtained by image capturing, and wherein, in the controlling, control is performed to connect the moving image to which the reproduction effect is not applied and the plurality of effect moving images, to record the moving image to which the reproduction effect is not applied and the plurality of effect moving images as a series of moving images.

15. A non-transitory computer-readable storage medium storing a program for executing the control method according to claim 14.

* * * * *